April 2, 1963 G. T. CULBERTSON 3,084,311

TIME DELAY CIRCUIT

Filed Feb. 8, 1960

INVENTOR.
George T. Culbertson
BY
Owen & Owen
ATTORNEYS

United States Patent Office 3,084,311
Patented Apr. 2, 1963

3,084,311

TIME DELAY CIRCUIT

George T. Culbertson, Gardena, Calif., assignor to Theodore W. Hallerberg, Los Angeles, Calif.

Filed Feb. 8, 1960, Ser. No. 7,410
5 Claims. (Cl. 317—148.5)

This invention relates in general to time delay circuits and more specifically time delay circuits utilizing double-base diodes.

The semi-conductor device termed a "double-base diode" generally consists of an "N" type semi-conductor bar mounted between two ohmic base contacts and with a "P" type emitter. If the interbase potential is maintained constant by a fixed source of potential, the voltage applied to the emitter may be used to control conduction of the device. In the cut-off condition, the potentials are such that the emitter is back biased. If the emitter potential is then sufficiently increased to overcome this bias, "holes" are injected into the bar and towards one of the bases by the field potential applied to the bar. The emitter current then increases rapidly until limited by the emitter source of potential.

A time delay circuit herein described utilizes the unique characteristics of a double-base diode. Accordingly, one of the objects of this invention is to provide a time delay circuit wherein the potential applied to the emitter of a double-base diode is used to control the delay period.

Another object of this invention is to provide a reliable time delay device utilizing solid state components.

A further object of this invention is to provide a time delay device which is insensitive to wide variations in the amplitude of input potentials.

Yet another object of this invention is to provide a greatly simplified time delay circuit having a minimum number of parts.

One main object of this invention is to provide an efficient time delay circuit utilizing a double-base diode to energize an output relay and to selectively reset said relay at accurately timed periods.

It is still another object of this invention to utilize a voltage regulator in connection with a time constant circuit as a control voltage applied to the emitter electrode of a double-base diode.

Figure 2:
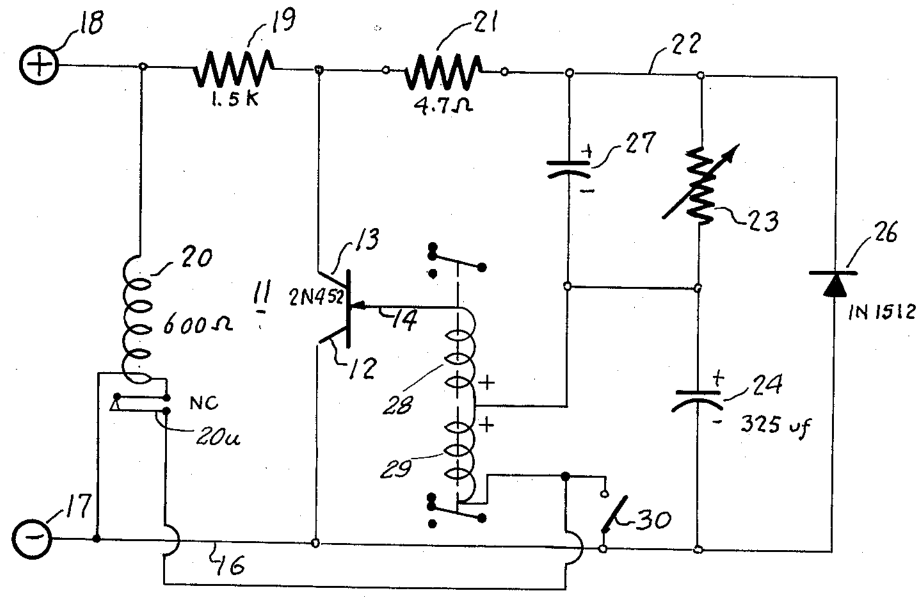
Figure 1:
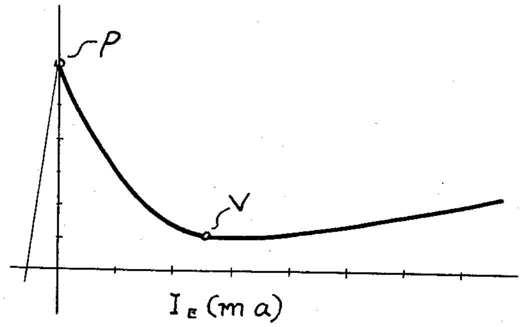

The novel features of this invention are set forth with particularity in the appended claims. The invention itself, however, with its preferred organization and mode of operation as well as further objects and advantages may best be understood from the following description when read with the accompanying drawings, in which:

FIG. 1 illustrates an emitter voltage-current characteristic of a double-base diode; and FIG. 2 illustrates schematically a preferred embodiment of the invention.

Referring now to FIG. 1, there is shown a typical emitter characteristic of a double-base diode as used in this invention. This waveform is illustrative of the emitter characteristic with the voltage between the bases maintained constant. To the left of the peak point P, there is a slight reverse or negative current through the emitter to base one diode which is comprised of one of the two ohmic connections to the base bar. As the emitter potential is increased to the peak point P, the diode becomes biased in the forward conducting region.

The zone between the peak point P and the valley point V is seen to have a negative resistance characteristic. "Holes" injected into the base bar increase the conductivity of the region between the emitter and the base one connection. As a consequence of the rapid increase in conductivity at the base region, the voltage between the emitter and base one decreases as the emitter current increases. Beyond or to the right of the point V, base one has reached its saturation and any further increase in emitter current merely provides an additional voltage drop between the emitter and base two portion of the bar. A double-base diode which may be used in this invention is a type 2N492 transistor supplied by the General Electric Company.

Referring now to FIG. 2, there is shown a schematic illustration of a time delay circuit utilizing the double-base diode 11 having the characteristics as described in connection with FIG. 1. Device 11 has the conventional base one 12 and base two 13 as well as emitter electrode 14. Base 12 is connected by way of common line 16 to one of the input terminals 17. The other input terminal 18 connects to base 13 through a voltage dropping resistor 19. The coil of an input sensing relay 20 is directly connected across input terminals 17 and 18 to be energized whenever input potential is present and whose contacts are included in a reset circuit as hereinafter described.

Resistor 21 has one end connected to base 13 and the other end to line 22. Adjustable resistor 23 in series with capacitor 24 is connected between lines 22 and 16 both being shunted by zener diode 26 which is poled in a back biased direction and serves to regulate the voltage applied between lines 22 and 16. Capacitor 27 is connected across resistor 23 and serves to prevent false triggering of the output relay 28. One terminal of output relay winding 28 is connected to emitter 14 and the other terminal in common to capacitor 27 and to the upper terminal of reset winding 29 of the output relay. The output relay may be provided with a magnetic latch which requires the reset winding to be energized to return the contacts to normal after the device has been initially pulsed to an operative condition. The lower terminal of reset winding 29 connects to line 16 through normally closed contacts 20*u* as well as through switch 30.

In operation, an input voltage which is positive at terminal 18 and negative at terminal 17 is applied to begin the desired time delay. Input sensing relay 20 is energized and its contacts 20*u*, which have heretofore been closed to reset the output relay and to discharge capacitor 24, now open to disable the automatic reset circuit during the presence of the input voltage.

Zener diode 26 is poled in its back direction and acts as a high impedance between lines 22 and 16. However, whenever the voltage applied across diode 26 attempts to exceed its rated value, which may be of the order of ten volts, it adjusts its reverse current to regulate or maintain the voltage at a constant level. The remaining voltage is primarily dropped across resistor 19. Resistor 21 has a small value of resistance and serves mainly to reduce the effect of changes in the value of input voltage. Thus when an input voltage of varying magnitudes is applied to terminals 17 and 18, a fixed voltage level is applied to the time constant network 23, 24.

Resistor 23 is shown as adjustable although it is understood that the capacitor 24 may be the variable element to change the desired time period. Capacitor 24 charges in the well-known manner to gradually increase the potential applied between emitter 14 and base 12. The double-base diode 11 has been in the region to the left of point P of FIG. 1 and an extremely small leakage current has been flowing in the emitter circuit. As the voltage from the emitter to base 12 reaches the value of point P, device 11 enters a negative resistance region and current rapidly flows through the emitter circuit moving down the curve to point V where no further discharge of capacitor 24 will occur. Instead, capacitor 24 will again start to charge partially through the back conductance of the diode as well as primarily through the resistor 23.

The surge of current through the emitter 14 is of the proper direction to energize output relay winding 28 and the relay utilizes its magnetic latch to remain in an energized condition until it is reset. The output relay may then be de-energized by momentarily closing the external reset switch 30. This closure accomplishes two functions. First, the capacitor 24 is discharged through the low impedance circuit including winding 29 preparing the circuit for a further timed delay period. Second, the current flow through winding 29 is in the proper direction to reset the output relay. When the switch 30 is used to reset the output relay, the input may remain connected to terminals 17 and 18 with the release of switch 30 marking the beginning of the timed period.

The reset winding may also be automatically energized to discharge the capacitor 24 by the removal of input voltage from terminals 17 and 18. When this occurs, input sensing relay 20 is de-energized allowing its contacts 20*u* to close and complete the reset circuit. False triggering of the output relay by transients is minimized by the addition of a capacitor 27 across the time constant resistor 23.

Although the description of this invention has been set forth with respect to a particular embodiment, it is not to be construed in a limiting sense. Many modifications and variations within the spirit and scope of the invention will now occur to those skilled in the art. For a definition of the invention, reference is made to the appended claims.

What I claim is:

1. A time delay circuit comprising an input source of direct current potential, a double-base diode having two base electrodes and an emitter electrode, means for selectively applying said direct current potential source across said two base electrodes to begin a time period, a time constant network including a resistor and a capacitor connected across said two base electrodes, a second capacitor connected across a portion of said time constant network to reduce the effect of transients entering from said input source, an output relay winding connected between said emitter electrode and the capacitor of said time constant network, said output relay having a magnetic latch and arranged to be actuated when said capacitor charges to a predetermined potential exceeding the peak point of said emitter current-voltage characteristic, a reset winding of said output relay connected across said first mentioned capacitor and means for selectively energizing said reset winding to discharge said first mentioned capacitor and to reset said output relay for a further time period operation.

2. A time delay circuit including an input source of direct current potential, a double-base diode having two base electrodes and an emitter electrode, voltage regulator means in circuit with said double base diode to maintain the interbase voltage substantially constant, a series circuit including a resistor and a capacitor connected across said two base electrodes, an energizing winding of an output relay connected between said emitter electrode and said capacitor, means for selectively applying said input source to begin a time period and to start charging said capacitor until the voltage across one of the diode junctions of the double-base diode exceeds a predetermined level and causes a rapid partial discharge of said capacitor, latching means for said output relay, a reset winding of said output relay connected across said capacitor, and means to energize said reset winding to release said latching means and to further discharge said capacitor.

3. The circuit as defined in claim 2 wherein the means to energize said reset winding comprises an external switch which may further discharge said capacitor and allow the start of a second time period without the removal of said input source.

4. An adjustable time delay device comprising an adjustable time constant series circuit including a resistor and a capacitor, regulator means for maintaining a voltage across said circuit at a constant level, a double-base diode having an emitter and two base electrodes, means connecting said two base electrodes across said series circuit, means for selectively applying a source of potential across said series circuit, said capacitor having a discharge circuit including one of said base electrodes, said emitter electrode and an energizing winding of an output relay to partially discharge said capacitor at the end of a predetermined time period, a second discharge path for said capacitor including a reset winding of said output relay, and switch means for selectively energizing said reset winding to more completely discharge said capacitor and prepare said device for a further timed period.

5. A device as defined in claim 4 wherein said regulator means comprises a zener diode poled in its reverse biased direction across said series circuit and a voltage dropping resistor connected to said source of potential.

References Cited in the file of this patent

UNITED STATES PATENTS

| | | |
|---|---|---|
| 2,927,259 | Neal | Mar. 1, 1960 |
| 2,947,916 | Beck | Aug. 2, 1960 |

FOREIGN PATENTS

| | | |
|---|---|---|
| 815,361 | Great Britain | June 24, 1959 |